United States Patent Office 3,379,495
Patented Apr. 23, 1968

3,379,495
PRODUCTION OF SODIUM CARBONATE
Richard Brooks, Northwich, England, assignor to Imperial Chemical Industries Limited, London, England, a corporation of Great Britain
No Drawing. Filed Apr. 20, 1964, Ser. No. 361,247
Claims priority, application Great Britain, Apr. 29, 1963, 16,774/63
6 Claims. (Cl. 23—63)

This invention relates to sodium carbonate and particularly to a process for making from light sodium carbonate a range of sodium carbonates having higher pouring densities than that of the ordinary light sodium carbonate of commerce and having improved flow properties.

Ordinary light sodium carbonate made by the ammonia-soda process has a pouring density of about 0.50 g./cc. and its particles are porous. We had considered that if a caustic soda solution were introduced in suitable amounts into the pores of this material, or of light sodium carbonate of even lower density, the caustic soda-laden light sodium carbonate would still be a superficially dry powder that could be conveniently handled and transported and for example tumbled in a rotating drum. We had further considered that the caustic soda in the light sodium carbonate would present a large surface, and if it were exposed to a carbon dioxide-bearing gas it would be possible to carbonate the caustic soda to sodium carbonate inside the pores and the product would have a higher density than the light sodium carbonate since some of the pores of the latter would then contain sodium carbonate instead of air.

The effect of such a reaction on the density of the light sodium carbonate can be calculated and it amounts in fact to an increase of approximately 1% in pouring density for every 1% by weight in the final product of sodium carbonate derived from caustic soda.

After the pores have been filled with sodium carbonate made by the carbonation therein of caustic soda it is possible to continue the process by reacting the pore-less particles of sodium carbonate with further quantities of caustic soda solution in a carbon dioxide-bearing gas, and thus by building up layers of sodium carbonate on them to increase still further their density and size.

We have now found that it is indeed possible to introduce caustic soda solutions into the pores of light sodium carbonate, and to carbonate it therein to sodium carbonate, but the effect on the density is unexpected and novel in that increases of density are achieved that are much greater than can be calculated on the basis of the mechanism described hereinbefore. For example, if the final product contains 5% by weight of sodium carbonate derived from caustic soda we can calculate that the pouring density would be 0.52–0.53 g./cc. whereas in fact we find the pouring density to be 0.72–0.74 g./cc. An increase of this size is not only surprising, and so far unexplained, but useful since the process provides a way of obtaining denser grades of sodium carbonate from light sodium carbonate that is simpler than known methods of densification.

When more than about 10% by weight of the final product has been derived from caustic soda the density of the product is still greater than can be expected from calculations but the difference is not so striking.

Thus according to the general embodiment of our invention we provide a process for making sodium carbonate having a pouring density greater than that of light sodium carbonate as made by the ammonia-soda process, that is to say greater than about 0.50 g./cc., comprising absorbing an aqueous caustic soda solution in and on the particles of said light sodium carbonate and carbonating said caustic soda therein and thereon to sodium carbonate by means of a carbon dioxide-bearing gas.

The pouring density of the light sodium carbonate can be progressively increased by our process from a starting figure of about 0.50 g./cc., or even lower, to 1.0 g./cc., and higher, since a product having a pouring density of above 0.50 g./cc. can itself function as a starting point. The increase in density is not so rapid beyond a value of about 0.74 but it is still unexpectedly greater than what can be calculated. The product having a pouring density of, say, 0.72–0.74 g./cc. may be separated and regarded as an end-product. Alternatively it may be subjected to the process in a subsequent reaction and separated thereafter, or if desired it need not be separated as such but can remain in the reaction system and therein continuously and progressively grow in density. An additional advantage of the process is that the densified light sodium carbonate has improved flow properties.

Thus according to one specific embodiment of our invention we increase the pouring density of light sodium carbonate over the range from about 0.50 to 0.72–0.74 g./cc., and we improve its flow properties, by absorbing an aqueous solution of caustic soda in and on the particles of said light sodium carbonate and carbonating said caustic soda therein and thereon to sodium carbonate by means of a carbon dioxide-bearing gas, the amount of said caustic soda being such that in the final product the proportion of sodium carbonate derived from said caustic soda is not more than 5% by weight.

According to a further specific embodiment of our invention we increase the pouring density of light sodium carbonate beyond 0.72–0.74 g./cc. by absorbing an aqueous solution of caustic soda in and on the particles of said light sodium carbonate and carbonating said caustic soda therein and thereon to sodium carbonate by means of a carbon dioxide-bearing gas, the amount of said caustic soda being such that in the final product the proportion of sodium carbonate derived from said caustic soda is more than 5% by weight.

The concentration of the caustic soda solution is conveniently from about 20% to 75% by weight. A particularly convenient range is from 45% to 50% since solutions of this order of concentration are readily available from the mercury-cathode cells in which sodium chloride brine is electrolysed.

The temperature of the carbonating reaction can be from about 75° to 200° C., preferably from about 100° C. to 150° C. The reaction may be operated at even lower temperatures if some water can be tolerated in the system. It is advantageous to use an amount of carbon dioxide that is in excess by 10% to 30% of the amount required to carbonate completely the caustic soda to sodium carbonate.

The process may be carried out in two stages in the first of which the caustic soda solution is mixed with the light sodium carbonate to give a free-flowing mixture and in the second of which this mixture is subjected to the carbon dioxide-bearing gas. Alternatively, addition of caustic soda and carbonation may take place substantially simultaneously, for example in a rotating drum light sodium carbonate would enter at one end and be sprayed with caustic soda solution and would then travel along the drum against a countercurrent of a carbon dioxide-bearing gas. Other arrangements, for example fluidised beds, can be envisaged.

In this specification the terms density and pouring density have the same meaning and correspond to what is often described in relation to powdered or granular materials as bulk density. The value is determined by pouring the sodium carbonate into a receptacle of known volume, without tamping or compacting, and expressing the weight required to fill it as grammes per cubic centimetre.

The process is illustrated by the following examples.

Example 1

2000 g. of light sodium carbonate having a pouring density of 0.54 g./cc. was sprayed with 150 g. of a caustic soda solution containing 50% by weight of NaOH in a rotating drum at a temperature of 130° C. to give a uniform, dry, free-flowing mixture. A gas containing 14.7% carbon dioxide was then introduced into the drum and the mixture carbonated, whilst tumbling, by means of an amount of gas containing about 20% more than the theoretical weight of carbon dioxide required to carbonate the 75 g. of NaOH to $Na_2CO_3$. The product after cooling was found to have a pouring density of 0.74 g./cc. and to contain insignificant amounts of caustic soda and sodium bicarbonate. By calculation the product would be expected to have had a density of 0.56–0.57 g./cc. A flow test through a given orifice showed a time of 12 seconds compared with one of 22 seconds for the light sodium carbonate starting material.

Example 2

300 g. of light sodium carbonate having a pouring density of 0.54 g./cc. was mixed over one hour at room temperature with 12.5 mls. of a caustic soda solution containing 50% by weight of NaOH in a paddle mixer of the type in which the paddles whilst rotating also move as a unit round the inside circumference of the mixing bowl, almost touching it in order to prevent the contents forming layers on the surface of the bowl. Assuming complete carbonation of this amount of caustic soda the proportion in the final product of $Na_2CO_3$ derived therefrom would be 3.9%. The mixture of light sodium carbonate and caustic soda solution was then transferred to a rotating drum and carbonated over 10 minutes at a temperature of 120° C. with a gas containing 15% $CO_2$ at a flow-rate of 6 litres/minute. The pouring density of the cooled product was 0.63 g./cc.

Example 3

300 g. of light sodium carbonate having a pouring density of 0.54 g./cc. was treated as described in Example 2 but with 25 instead of 12.5 mls. of a caustic soda solution containing 50% by weight of NaOH. This amount of caustic soda, assuming it were completely carbonated, would account for 7.6% of the $Na_2CO_3$ in the final product. After carbonation as described in Example 2 the cooled product was found to have a pouring density of 0.87 g./cc. and to be free-flowing.

Example 4

300 g. of light sodium carbonate having a pouring density of 0.54 g./cc. was treated as described in Example 2 but with 50 instead of 12.5 mls. of a caustic soda solution containing 50% by weight of NaOH. This amount of caustic soda, assuming it were completely carbonated, would account for 14.2% of the $Na_2CO_3$ in the final product. After carbonation as described in Example 2 but for 15 instead of 10 minutes the cooled product was found to have a pouring density of 0.97 g./cc. It contained less than 0.10% by weight of NaOH and was free-flowing.

Example 5

In this experiment the mixture of light sodium carbonate and caustic soda solution was mixed for a much longer time than in the experiments on which Examples 1–4 are based. The object of this was to discover what would be the effect on pouring density of the increased dispersion of the caustic soda solution throughout the light sodium carbonate resulting from a longer mixing time. 300 g. of light sodium carbonate having a pouring density of 0.54 g./cc. was treated as described in Example 2 with 12.5 mls. of a caustic soda solution containing 50% by weight of NaOH but mixing was carried on for sixteen instead of one hour. After carbonation as described in Example 2 the cooled product was found to have a pouring density of 0.74 g./cc. Thus for the same proportion in the final product of $Na_2CO_3$ derived from NaOH, namely 3.9%, the increased mixing time prior to carbonation caused the pouring density to increase from 0.63 to 0.74 g./cc.

What we claim is:

1. A process for increasing the pouring density of light sodium carbonate having a pouring density of about 0.54 g./cc. comprising first absorbing an aqueous solution of caustic soda in and on particles of the light sodium carbonate to obtain a dry, free-flowing mixture of caustic soda absorbed in the light sodium carbonate, and thereafter contacting said dry mixture with an excess of carbon dioxide at about 75° C. to about 200° C. to carbonate all of the caustic soda within and upon the sodium carbonate particles of said mixture, the carbonate thus formed amounting to not more than about 10% by weight of the final product.

2. The process as claimed in claim 1 wherein the densified light sodium carbonate has a pouring density within the range of from about 0.72 g./cc. to about 0.74 g./cc. by absorbing in and on the light sodium carbonate prior to the carbonation step an amount of caustic acid such that in the final product the proportion of sodium carbonate derived from the caustic soda is not more than 5% by weight of the total final product.

3. The process as claimed in claim 1 wherein the final product has a pouring density greater than 0.74 g./cc. by absorbing upon and within the light sodium carbonate particles, prior to the carbonation step, an amount of caustic soda such that the proportion of sodium carbonate derived from the caustic soda is more than 5% but less than 10% by weight of the final product.

4. A process as claimed in claim 1 in which the caustic soda solution contains from 45% to 50% by weight of sodium hydroxide.

5. A process as claimed in claim 1 in which the temperature at which the carbonation of the caustic soda takes place is from 100° C. to 150° C.

6. A process as claimed in claim 1 in which the weight of carbon dioxide supplied to the reaction system is greater by 10% to 30% than the theoretical weight required to carbonate the caustic soda completely to sodium carbonate.

References Cited

UNITED STATES PATENTS

| | | | |
|---|---|---|---|
| 2,948,967 | 8/1960 | Myers | 23—63 X |
| 3,202,477 | 8/1965 | Loeffler et al. | 23—63 |

FOREIGN PATENTS

| | | |
|---|---|---|
| 776,331 | 6/1957 | Great Britain. |

OSCAR R. VERTIZ, *Primary Examiner.*

MILTON WEISSMAN, *Examiner.*

G. T. OZAKI, *Assistant Examiner.*